Figure 1:
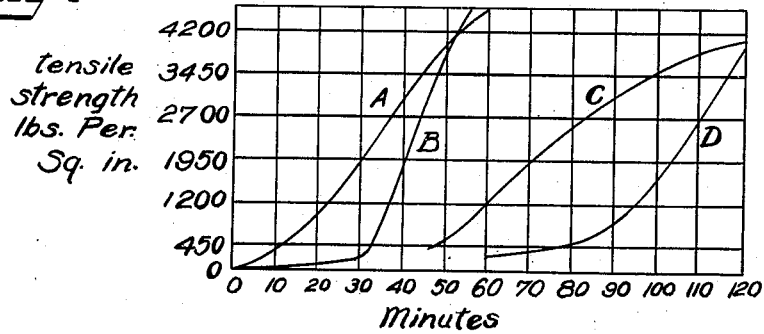

April 30, 1940.    P. C. JONES    2,199,105

VULCANIZATION OF RUBBER

Filed April 27, 1938

Inventor
Paul C. Jones
By Willis F. Avery
Atty

Patented Apr. 30, 1940

2,199,105

UNITED STATES PATENT OFFICE 2,199,105

VULCANIZATION OF RUBBER

Paul C. Jones, Akron, Ohio, assignor to The B. F. Goodrich Company, New York, N. Y., a corporation of New York Application April 27, 1938, Serial No. 204,556

16 Claims. (Cl. 260—780)

This invention relates to the vulcanization of rubber, and to a method whereby vulcanization of rubber at processing temperatures may be prevented.

It has long been known that dialkyl dithiocarbamates are accelerators causing rapid vulcanization at such low temperatures that it has been difficult to employ them commercially. This tendency to prevulcanize or "scorch" has been corrected to some extent by substituting the corresponding diaryl compounds. Even the diaryl compounds may scorch, however, if stocks containing large amounts are masticated or otherwise processed at temperatures as high as 240° C.

It is an object of this invention accordingly to provide delayed action accelerator combinations which, when included therein, reduce the tendency of compositions containing certain diaryl dithiocarbamates to scorch at processing temperatures without retarding the vulcanization at curing temperatures. Other objects are to reduce the total accelerator concentration in rubber compositions with a consequent reduction in cost, and to provide vulcanized rubber compositions having greater resistance to deterioration, lower hysteresis, and better flex-resistance than compositions vulcanized in the conventional manner.

I have discovered that the activity of accelerators of the class consisting of diaryl dithiocarbamic acids, their salts, and their esters at processing temperatures is greatly reduced in the presence of a member of the class consisting of mercapto thiazoles and dithiazyl sulfides. This delayed action is particularly surprising in view of the fact that these latter compounds are vigorous accelerators themselves. Suitable accelerators which may be used in the delayed action accelerator combinations of this invention include, accordingly, free acids such as diphenyl dithiocarbamic acid or the similar ditolyl (ortho, meta, para or mixed), dinaphthyl (alpha, beta or mixed), dixenyl, dianthryl, diphenanthryl, diindenyl, phenyl-naphthyl, phenyl-xenyl, phenylcumyl, di - p - nitrophenyl, di - p - chlorphenyl, phenyl - m - bromphenyl, di - p - hydroxyphenyl, phenyl-p-phenyloxyphenyl, phenyl - p - anilinophenyl, di - o - anisyl, phenyl - p - methylaminophenyl, or other like diaryl dithiocarbamic acids; salts of diaryl dithiocarbamic acids such as metal salts like sodium or zinc diphenyl dithiocarbamate, and ammonium salts like trimethylammonium diphenyl dithiocarbamate, particularly quaternary ammonium salts such as benzyl hexamethylenetetrammonium diphenyl dithiocarbamate and methyl hexamethylenetetrammonium diphenyl dithiocarbamate; and esters of diaryl dithiocarbamic acid including tris (diaryldithiocarbamylalkyl) amines such as tris (diphenyldithiocarbamylmethyl) amine (which is an ester of trimethanolamine), and polynitroaryl esters such as 2,4 dinithrophenyl diphenyl dithiocarbamate, etc. Other examples of accelerators which may be advantageously used with the delayed action accelerators of this invention are disclosed in U. S. Patent No. 2,102,621 issued to Goodwin and Sloan, Serial No. 156,172 filed by me July 28, 1937, Serial No. 163,986 filed by Semon Sept. 15, 1937, Serial No. 163,989 filed by Semon Sept. 15, 1937, Serial No. 163,991 filed by Sloan Sept. 15, 1937, and Serial No. 164,013 filed by Semon Sept. 15, 1937.

A wide range of thiazole accelerators may be used to form the delayed action accelerator combinations of this invention. Illustrative of the types of compounds which may be used are 2 - mercaptobenzothiazole, 2 - mercaptonaphthothiazole, 2 mercapto-4-methylthiazole, 2-mercapto - 4,5 dimethylthiazole, 2 - mercapto - 4 - methyl-5-ethylthiazole and similar alkyl or arylene mercaptothiazoles and the corresponding dithiazyl sulfides including the mono- and polysulfides such as dibenzothiazyl disulfide, dibenzothiazyl tetrasulfide, bis-4,5-dimethylthiazyl monosulfide, bis-4,5-dimenthylthiazyl disulfide, etc. The two types of accelerators are usually mixed in proportions varying from 1:3 to 3:1 parts by weight.

Figure 2:
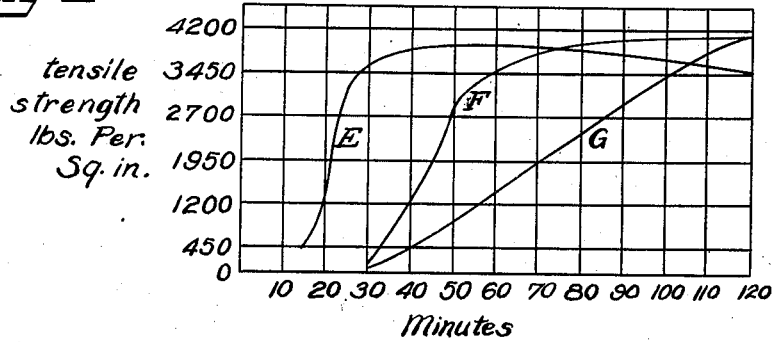
Figure 3:
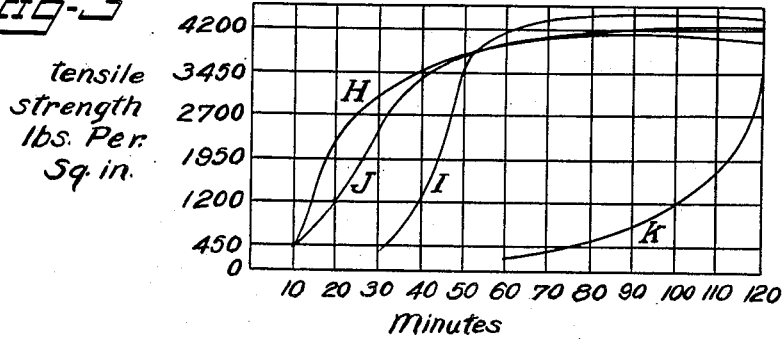

The beneficial results obtained by practicing the method of this invention may be better understood by reference to the accompanying drawing of which Fig. 1 represents graphically the accelerating properties of a combination of 2-mercaptobenzothiazole and tris (diphenyldithiocarbamylmethyl) amine;

Fig. 2 represents graphically the accelerating properties of a combination of dibenzothiazyl disulfide and tris (diphenyldithiocarbamylmethyl) amine; and Fig. 3 represents graphically the accelerating properties of a combination of dibenzothiazyl disulfide and benzyl hexamethylenetetrammonium disulfide.

Referring to the drawing, curve A represents the rate of cure at 240° F. of the following tire tread composition:

| | Parts by weight |
|---|---|
| Rubber | 100 |
| Carbon black | 40 |
| Sulfur | 3 |
| Stearic acid | 2 |
| Phenyl-beta-naphthyl amine | 0.75 |
| Zinc oxide | 5 |
| Softeners | 2 |
| Tris (diphenyl dithiocarbamylmethyl) amine | 0.5 |

Curve B represents the rate of cure at 240° F. of the above composition containing in addition

10. The process which comprises vulcanizing rubber in the presence of 2-mercaptobenzothiazole and a diaryl dithiocarbamate.

11. The process which comprises vulcanizing rubber in the presence of tris(diphenyl-dithiocarbamylmethyl) amine and 2-mercaptobenzothiazole.

12. A rubber composition which has been vulcanized in the presence of a member of the class consisting of diaryl dithiocarbamic acids, their salts, and their esters and a member of the class consisting of mercaptothiazoles and thiazyl sulfides.

13. A rubber composition which has been vulcanized in the presence of benzyl hexamethylenetetrammonium diphenyl dithiocarbamate and dibenzothiazyl disulfide.

14. A rubber composition which has been vulcanized in the presence of tris(diphenyldithiocarbamylmethyl) amines and bis-4,5-dimethylthiazyl disulfide.

15. A rubber composition which has been vulcanized in the presence of tris(diphenyldithiocarbamylmethyl) amine and 2-mercaptobenzothiazole.

16. The process which comprises vulcanizing rubber in the presence of a member of the class consisting of diaryl dithiocarbamic acids, their salts, and their esters and a member of the class consisting of mercaptothiazoles and dithiazyl sulfides in proportions from 1:3 to 3:1.

PAUL C. JONES.